United States Patent [19]

Akin, Jr. et al.

[11] Patent Number: 5,796,552
[45] Date of Patent: Aug. 18, 1998

[54] SUSPENSION WITH BIAXIALLY SHIELDED CONDUCTOR TRACE ARRAY

[75] Inventors: William R. Akin, Jr., Morgan Hill; Arun Balakrishnan, Fremont; Stephen P. Williams, Morgan Hill; Christopher M. Carpenter, Sunnyvale, all of Calif.

[73] Assignee: Quantum Corporation, Milpitas, Calif.

[21] Appl. No.: 785,570

[22] Filed: Jan. 21, 1997

Related U.S. Application Data

[63] Continuation of Ser. No. 720,833, Oct. 3, 1996, Pat. No. 5,737,152.

[51] Int. Cl.⁶ ............................................. G11B 5/48
[52] U.S. Cl. ............................................. 360/104
[58] Field of Search ....................... 360/104–109, 360/103

[56] References Cited

U.S. PATENT DOCUMENTS

| | | | |
|---|---|---|---|
| 4,761,699 | 8/1988 | Ainslie et al. | 360/103 |
| 4,819,094 | 4/1989 | Oberg | 360/104 |
| 4,996,623 | 2/1991 | Erpelding et al. | 360/104 |
| 5,001,583 | 3/1991 | Matsuzaki | 360/104 |
| 5,006,946 | 4/1991 | Matsuzaki | 360/104 |
| 5,021,907 | 6/1991 | Zak | 360/104 |
| 5,391,842 | 2/1995 | Bennin et al. | 360/104 |
| 5,392,179 | 2/1995 | Sendoda | 360/104 |
| 5,491,597 | 2/1996 | Bennin et al. | 360/104 |
| 5,519,552 | 5/1996 | Kohira et al. | 360/104 |
| 5,530,604 | 6/1996 | Pattanaik | 360/104 |
| 5,597,496 | 1/1997 | Masaichi et al. | 360/103 |

OTHER PUBLICATIONS

Excerpt, Dorf, Ed., *The Electrical Engineering Handbook*, CRC Press, Boca Raton, FL., ©1993, pp. 884–885.

*Primary Examiner*—Jefferson Evans
*Attorney, Agent, or Firm*—David B. Harrison; Debra A. Chun

[57] ABSTRACT

A head suspension has an integrated multi-layer trace conductor array for supporting and electrically interconnecting a read/write head to electronic circuitry in a disk drive. The trace conductor array includes an integrally formed electrical shield which may be grounded or ungrounded and formed to have a depth greater than a skin effect depth at a frequency of an interfering wave front.

14 Claims, 3 Drawing Sheets

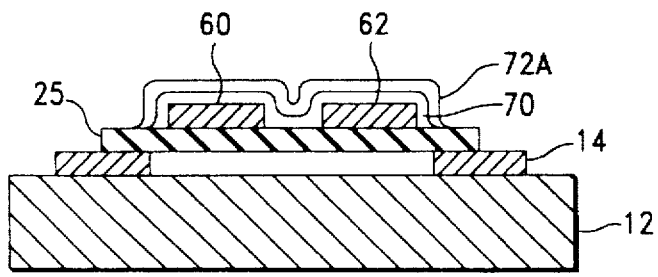
FIG.—4
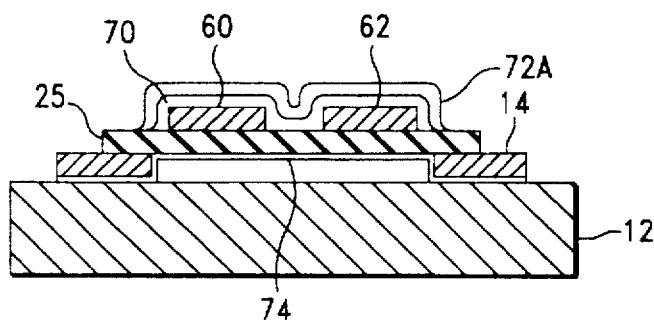
FIG.—5
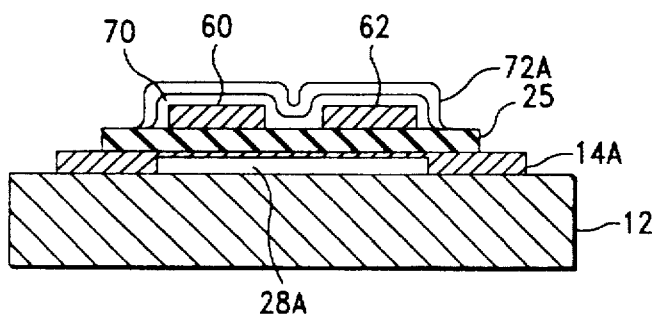
FIG.—6
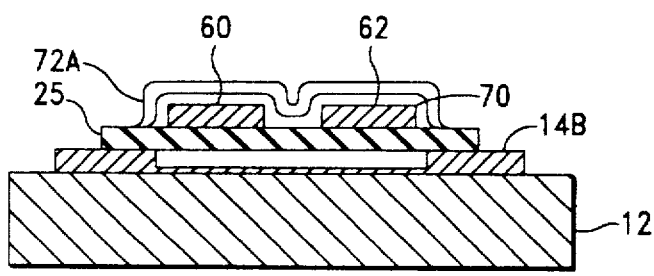
FIG.—7
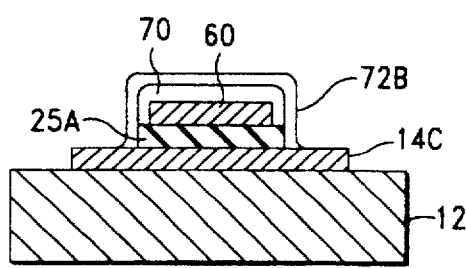
FIG.—8

SUSPENSION WITH BIAXIALLY SHIELDED CONDUCTOR TRACE ARRAY

REFERENCE TO RELATED APPLICATIONS

This application is a continuation-in-part of U.S. patent application Ser. No. 08/720,833 filed on Oct. 3, 1996, entitled: "Suspension with Multi-Layered Integrated Conductor Trace Array for Optimized Electrical Parameters", now U.S. Pat. No. 5,737,152, the disclosure thereof being incorporated herein by reference.

FIELD OF THE INVENTION

This invention relates generally to structure and method for electrically shielding a conductor trace array formed integrally with a head suspension assembly for use in a magnetic hard disk drive.

BACKGROUND OF THE INVENTION

Contemporary magnetic hard disk drives typically include a rotating rigid storage disk and a head positioner for positioning a data transducer at different radial locations relative to the axis of rotation of the disk, thereby defining numerous concentric data storage tracks on each recording surface of the disk. The head positioner is typically referred to as an actuator. Although numerous actuator structures are known in the art, in-line rotary voice coil actuators are now most frequently employed due to their simplicity, high performance, and their ability to be mass-balanced about their axis of rotation, the latter being important for making the actuator less sensitive to perturbations. A closed-loop servo system within the disk drive is conventionally employed to operate the voice coil actuator and thereby position the heads with respect to the disk storage surface.

The read/write transducer, which may be of a single or dual element design, is typically deposited upon a ceramic slider structure having an air bearing surface for supporting the transducer at a small distance away from the surface of the moving medium. Single write/read element designs typically require two-wire connections while dual designs having separate reader and writer elements require two pairs of two-wire connections. Magnetoresistive (MR) heads having separate inductive write elements in particular generally require four wires. The combination of an air bearing slider and a read/write transducer is also known as a read/write head or a recording head.

Sliders are generally mounted to a gimbaled flexure structure attached to the distal end of a suspension's load beam structure. A spring biases the load beam and the head towards the disk, while the air pressure beneath the head developed by disk rotation relative to the slider pushes the head away from the disk. The gimbal enables the slider to present a "flying" attitude toward the disk surface and follow its topology. An equilibrium distance defines an "air bearing" and determines the "flying height" of the head. By utilizing an air bearing to support the head away from the disk surface, the head operates in a hydrodynamically lubricated regime at the head/disk interface rather than in a boundary lubricated regime. The air bearing maintains a spacing between the transducer and the medium which reduces transducer efficiency. However, the avoidance of direct contact vastly improves the reliability and useful life of the head and disk components. Demand for increased areal densities may nonetheless require that heads be operated in pseudo-contact or even boundary lubricated contact regimes, however.

Currently, nominal flying heights are on the order of 0.5 to 2 microinches. The magnetic storage density increases as the head approaches the storage surface of the disk. Thus, a very low flying height is traded against device reliability over a reasonable service life of the disk drive. At the same time, data transfer rates to and from the storage surface are increasing; and, data rates approaching 200 megabits per second are within practical contemplation.

The disk drive industry has been progressively decreasing the size and mass of the slider structures in order to reduce the moving mass of the actuator assembly and to permit closer operation of the transducer to the disk surface, the former giving rise to improved seek performance and the latter giving rise to improved transducer efficiency that can then be traded for higher areal density. The size (and therefore mass) of a slider is usually characterized with reference to a so-called standard 100% slider ("minislider"). The terms 70%, 50%, and 30% slider ("microslider", "nanoslider", and "picoslider", respectively) therefore refer to more recent low mass sliders that have linear dimensions that are scaled by the applicable percentage relative to the linear dimensions of a standard minislider. Sliders smaller than the 30% picoslider, such as a 20% "femtoslider", are presently being considered and are in early development by head vendors. As slider structures become smaller, they generally require more compliant gimbals; hence, the intrinsic stiffness of the conductor wires attached to the slider can give rise to a significant undesired mechanical bias effect.

To reduce the effects of this intrinsic wire stiffness or bias, integrated flexure/conductor structures have been proposed which effectively integrate the wires with an insulating flexible polymeric resinous flexure such that the conductors are exposed at bonding pads positioned at the distal end of the flexure in the proximity of the head. U.S. Pat. No. 5,006,946 to Matsuzaki discloses an example of such a configuration. U.S. Pat. Nos. 5,491,597 to Bennin et al., 4,761,699 to Ainslie et al., and 4,996, 623 to Erpelding et al., disclose further examples known in the art. While such wiring configurations do enjoy certain performance and assembly advantages, the introduction of the disclosed flexible polymeric resinous material in the flexure and gimbal structure raises a number of challenging design issues. For example, the thermal expansion properties of the resinous material is not the same as the prior art stainless steel structures; and, the long-term durability of such resinous structures, including any requisite adhesive layers, is unknown. Therefore, hybrid stainless steel flexure and conductor structures have been proposed which incorporate most of the benefits of the integrated conductor flex-circuit flexure structures while remaining largely compatible with prior art fabrication and load beam attachment methods. Such hybrid designs typically employ stainless steel flexures having deposited insulating and conductive trace layers for electrical interconnection of the head to the associated drive electronics, e.g., a proximately located preamplifier chip and downstream read channel circuitry typically carried on a circuit board (along with other circuitry) attached to the head/disk assembly.

As taught by U.S. Pat. No. 5,491,597 to Bennin et al., entitled: "Gimbal Flexure and Electrical Interconnect Assembly", the disclosed prior approach called for use of a spring material for the conductive trace layers, such as beryllium-copper alloy, which admittedly has higher electrical resistance than pure annealed copper, for example. On the other hand, pure annealed copper, while a satisfactory electrical conductor at high frequencies, also manifests high ductility rather than spring-like mechanical resilience, and therefore lacks certain mechanical spring properties desired in the interconnect trace material. Traces formed of pure copper plated or deposited onto e.g. a nickel base layer provide one alternative to the beryllium-copper alloy relied upon by the Bennin et al. approach.

These hybrid flexure designs employ relatively lengthy runs of conductor trace pairs or four-wire sets which extend from bonding pads at the distal, head-mounting end of the flexure to the proximal end of the flexure, to provide a conductive path from the read/write head along the length of the associated suspension structure to the preamplifier or read-channel chip(s). Because the conductor traces are positioned in a generally parallel, spaced apart relationship in close proximity to the flexure, the exposed traces lack the self-shielding properties of the conventional minute twisted-wire pair heretofore used to connect each head read/write element to down-stream processing electronics. The exposed traces are therefore capable of picking up unwanted signals which may distort or mask the very low-level signals induced in the read element of the head.

Micro strip line technology teaches that the loop and inter-conductor capacitance may be changed by changing the dimensions of and/or spacing between micro strips forming a transmission line. However, in the case of integrated trace array wiring schemes for use with head suspension load beams, the dimensions of the conductors are governed by mechanical constraints including the space available on the flexure for the trace interconnect array, and the trace conductor dimensions cannot be changed very much insofar as impedance matching or tuning is concerned.

Since printed circuit conductors do not enjoy the attributes of a twisted-pair, noise can be an important factor affecting electrical performance of the trace interconnect array. While an earlier commonly assigned and copending U.S. patent application Ser. No. 08/724,978, filed on Oct. 3, 1996, teaches that the read path conductive traces may be shielded by using the write path conductive traces, in practice this approach may not be deemed to be suitable in some situations for structural reasons, as opposed to electrical reasons. For example, to maintain mechanical symmetry of the load beam structure, the read traces and the write traces are separated and routed separately along opposite longitudinal edges of the load beam. This symmetrical arrangement precludes use of the write traces to shield the read traces. Thus, a hitherto unsolved need has remained for improved trace conductor shielding in conductor trace arrays used in head mounting structures of hard disk drives.

SUMMARY OF THE INVENTION WITH OBJECTS

A general object of the present invention is to provide a low-profile, robust and reliable high performance suspension assembly having a biaxially shielded integral conductor trace array for electrically interconnecting a read/write head to associated read/write circuitry which overcomes limitations and drawbacks of the prior art.

Another general object of the present invention is to provide an integrated suspension and conductor structure having controlled multiple layer trace geometries which are effectively shielded, thereby overcoming limitations and drawbacks of the prior art.

Another object of the present invention is to provide an improved suspension and multi-layer biaxially shielded conductor trace array for supporting, electrically connecting to read/write head elements carried on a slider in a hard disk drive.

A suspension assembly in accordance with principles of the present invention includes a load beam and a flexure for supporting a read/write head/slider assembly adjacent to a storage medium and for electrically interconnecting the head to read/write circuitry. The assembly further includes a first electrical insulation layer disposed, for example, on the flexure; first and second electrical signal trace paths forming a conductor trace pair and disposed in generally parallel, spaced-apart relationship on the first electrical insulation layer, a second electrical insulation layer covering the conductor trace pair, and a conductive shield layer formed over the second electrical insulation layer for shielding the conductor trace pair from extraneous electrical interference. In one preferred form the shield layer is grounded to the flexure. In another preferred form, the shield layer is electrically floated with respect to the ground plane presented by the flexure, and the shield layer is provided with a thickness greater than skin effect depth at a frequency of an interfering wave front.

In one related aspect of the present invention, first and second pairs of spaced apart, generally parallel signal trace paths are formed on the flexure such that the first conductor trace pair is formed along one longitudinal edge region of the flexure whereas the second conductor trace pair is formed along another longitudinal edge region of the flexure transversely opposite to the one longitudinal edge region, such that the second conductor trace pair is substantially symmetrical with the first conductor trace pair about a longitudinal axis of symmetry.

These and other objects, advantages, aspects, and features of the present invention will be more fully appreciated and understood upon consideration of the following detailed description of preferred embodiments presented in conjunction with the accompanying drawings.

BRIEF DESCRIPTION OF THE DRAWINGS

In the Drawings:

FIG. 4 is a view similar to the FIG. 3B view showing an integrated floating shield layer for shielding the pair of traces, also in accordance with principles of the present invention.

FIG. 5 is a view similar to the FIG. 4 view showing formation of a shield by metal deposition at the flexure layer, also in accordance with principles of the present invention.

FIG. 6 is a view similar to the FIG. 4 view showing formation of a partially etched cavity at the flexure layer, also in accordance with principles of the present invention.

FIG. 7 is a view similar to the FIG. 4 view showing formation of a partially etched cavity at the flexure layer which is filled with a dielectric filler material, also in accordance with principles of the present invention.

FIG. 8 is a view similar to the FIG. 3B view showing a thin conductive shield formed on an outer dielectric layer for shielding a single conductive trace in a single-ended arrangement, also in accordance with principles of the present invention.

DETAILED DESCRIPTION OF PREFERRED EMBODIMENTS

Figure 1:
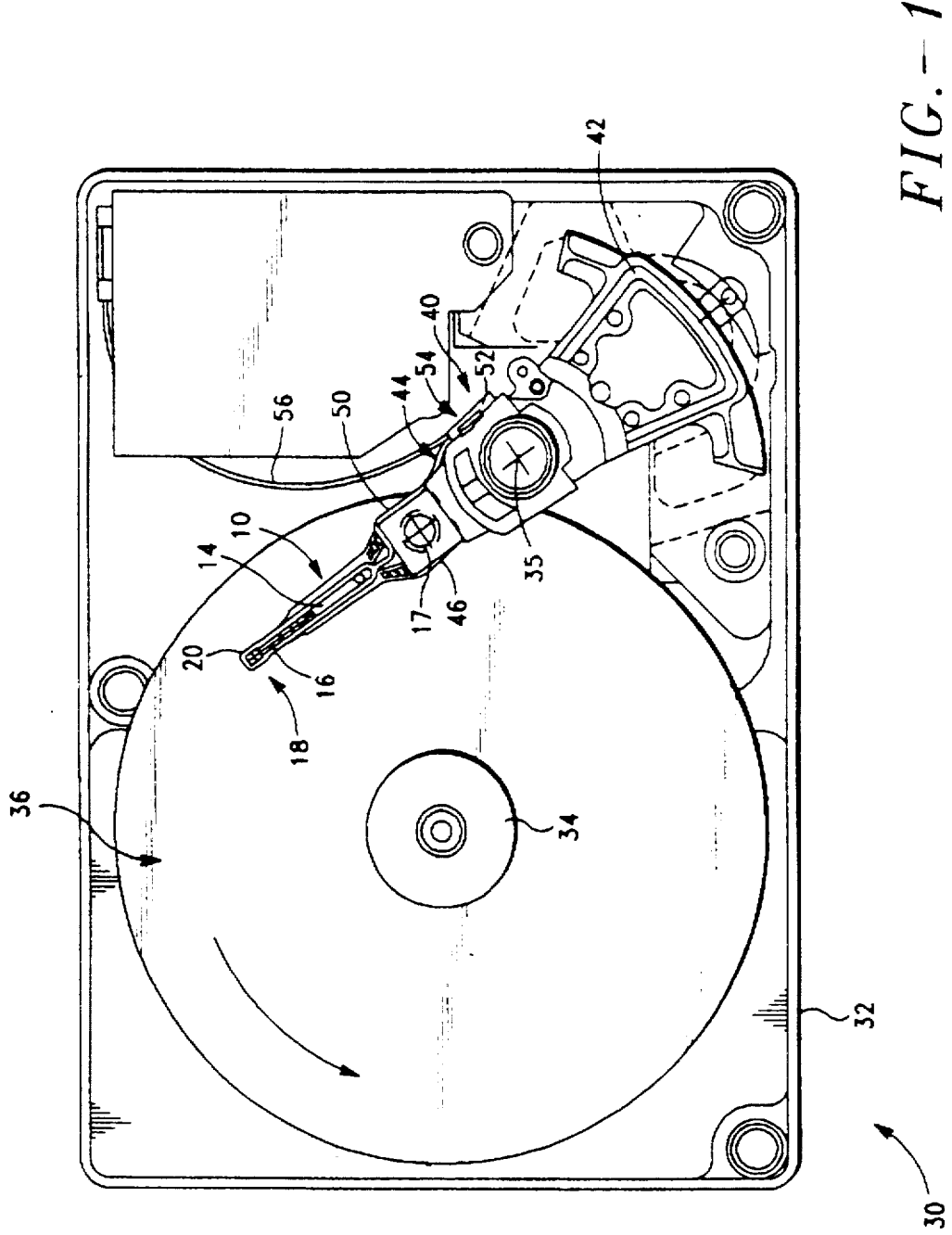
FIG. 1 is an enlarged, diagrammatic plan view of a head disk assembly of a hard disk drive which includes an actuator having a suspension assembly with a shielded multi-layer conductive trace array incorporating principles of the present invention.
Figure 2:
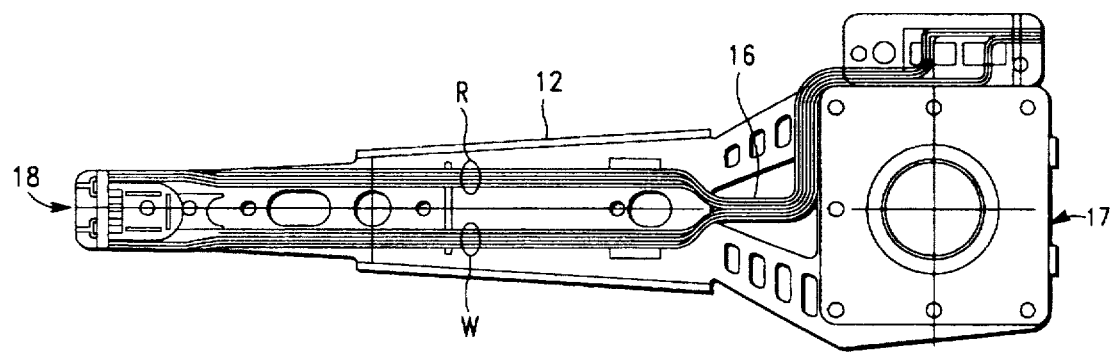
FIG. 2 is an enlarged diagrammatic plan view of an integrated flexure/conductor load beam structure included in the FIG. 1 head disk assembly having shielded conductive traces in accordance with principles of the present invention.

Referring to the drawings, where like characters designate like or corresponding parts throughout the views, FIG. 1 presents a diagrammatic top plan view of a head/disk assembly (HDA) of a hard disk drive 30. The hard disk drive 30 employs at least one load beam assembly 10 including a load beam 12 carrying a flexure 14. The flexure 14 includes a shielded trace interconnect array 16 as a preferred embodiment of the present invention. FIG. 1 shows the load beam assembly 10 with the flexure 14 and shielded trace interconnect array 16 employed within its intended operating environment.

In the present example disk drive 30 includes e.g. a rigid base 32 supporting a spindle 34 (and spindle motor, not shown) for rotating at least one storage disk 36 in a direction shown by the curved arrow. Drive 30 also includes a rotary actuator assembly 40 rotationally mounted to the base 32 at a pivot point 35. The actuator assembly 40 includes a voice coil 42 which, when selectively energized by control circuitry (not shown), moves and thereby positions an actuator E-block 44 and head arms 46 (and load beam assemblies 10) at radial track positions defined on the facing surfaces of storage disks 36. At least one of the load beam assemblies 10 is secured at its proximal end 17 to a distal end of a head arm 46, e.g. by conventional ball-swaging techniques.

Conventionally, but not necessarily, two load beam assemblies 10 are attached to head arms 46 between disks 36; and, one load beam structure 10 is attached to a head arm above and a head arm below the uppermost and lowermost disks of a disk stack comprised of multiple disks 36 spaced apart on spindle 34. The trace interconnect structure 16 connects to a flexible trace/film segment 50 which extends to e.g. a ceramic hybrid circuit substrate 52 secured to a side of the E-block 44. The ceramic hybrid circuit 52 secures and connects a semiconductor chip 54 forming a read preamplifier/write driver circuit. (In some applications, a flex circuit substrate carrying a surface mounted IC 54 may be preferred in lieu of the ceramic hybrid circuit substrate 52). Most preferably, the chip 54 is nested between the ceramic substrate of the hybrid circuit 52 and the E-block sidewall, and is secured to the sidewall by a suitable conductive adhesive or thermal transfer compound such that heat generated during operation of the chip 54 is dissipated into the E-block by conduction, and outwardly into the ambient air volume by convection. A flex circuit 56 provides electrical connections to and from the substrate 52 and other electronic circuitry of the disk drive (not shown in FIG. 1).

As shown in FIGS. 2, 3, 3A, and 3B the load beam assembly 10 includes a generally planar formed stainless steel load beam 12 and an elongated flexure 14. In the present example, the flexure 14 is formed of thin stainless steel sheet material which is e.g. approximately 20–25 microns thick, and most preferably 25 microns thick. Conductive traces 60 and 62 are formed in a spaced-apart, generally parallel relationship and are approximately 10–18 microns thick copper conductor, and most preferably 10 microns thick. The conductor traces 60, 62 shown in FIG. 3B form e.g. a read path conductor trace pair of the interconnect structure 16 which extends from the proximal end 17 of the load beam assembly 10 to a read element of a head slider 20 located at the slider-supporting distal end 18 of the load beam assembly 10. A similar conductor trace pair forms a write path W for connection to a write element of the head slider 20.

Figure 3:
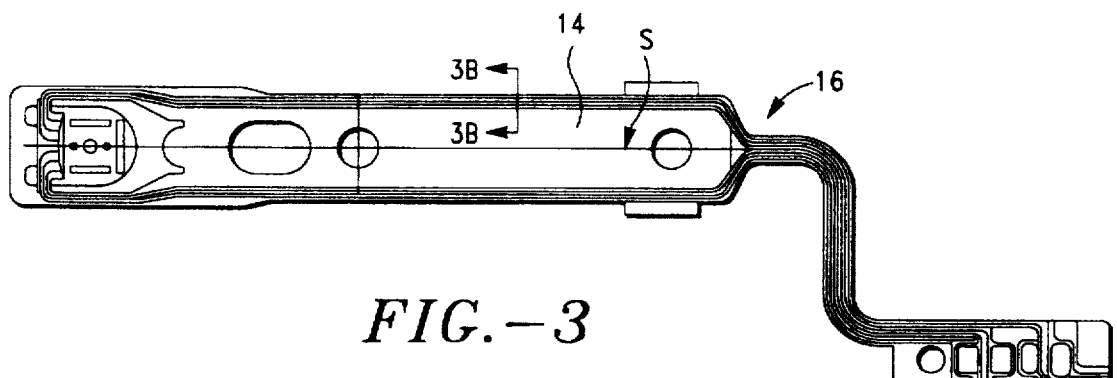
FIG. 3 is an enlarged plan view of a flexure of the FIG. 2 load beam structure having integral wiring incorporating the tuned conductive trace array.
Figure 3A:
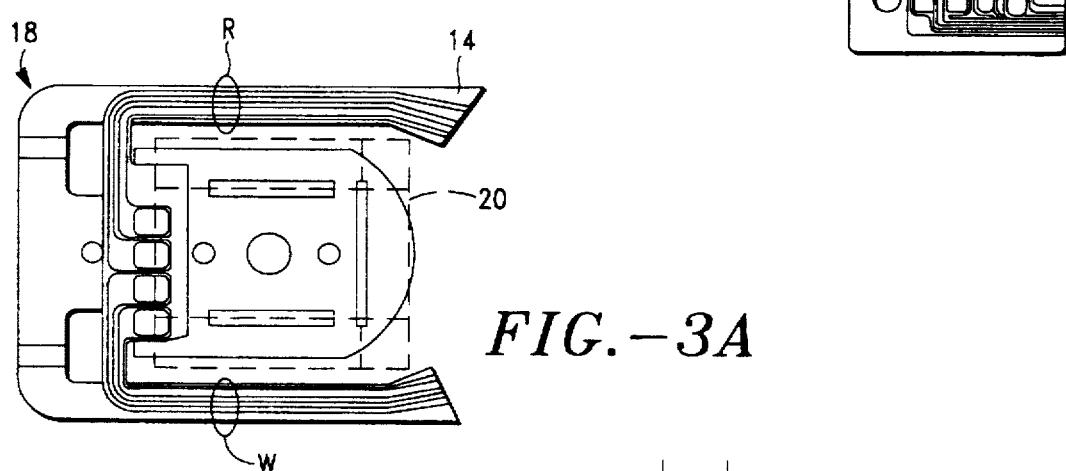
FIG. 3A is a greatly enlarged plan view of a read/write head connection region of the FIG. 3 flexure trace array and wherein the head slider is shown in dashed line outline.

The conductor trace pairs R and W are preferably symmetrically formed and spaced apart along the longitudinal edges of the flexure 14 about a longitudinal axis of symmetry S (FIG. 3) so as not to detract from desired mechanical properties of the flexure. A transducer head slider 20 (shown in dashed line outline in FIG. 3A) is attached to the gimbal 14 by a suitable adhesive at the distal end 18 of the load beam structure 10. As shown in FIG. 3C the connection pads 22 at the distal end 18 are provided for connection by e.g. ultrasonically-welded gold ball bonds 56 to aligned connection pads 24 of a dual-element (four conductor) thin film magneto-resistive read/thin-film inductive write structure 26 formed on a trailing edge of the slider body 20. Preferably, although not necessarily, the slider body 20 is a 30% picoslider.

Interconnect structure 16 includes a high dielectric polyimide film base interposed between the conductive traces 60 and 62 of the conductor array 16 mounted to the stainless steel flexure 14. The dielectric layer 25 has a thickness of approximately 10–18 microns and is most preferably about 10-microns thick. The dielectric layer 25 may be applied e.g. in liquid state by any suitable method, such as silk screening, spin coating, or coating with a precision blade or roller. Other methods for applying the polyimide dielectric layer 25 as by an adhesive carrying the polyimide are within contemplation of the present invention.

As taught by the co-inventors' commonly assigned, copending U.S. patent application Ser. No. 08/720,836, filed on Oct. 3, 1996, for "Suspension with Integrated Conductors Having Trimmed Impedance", the disclosure thereof being incorporated herein by reference, the flexure 14, in addition to providing a gimbal mounting for the read/write head, preferably defines one or more openings or troughs 28 of controlled width (w) and placement relative to the conductive traces 60 and 62 of the conductor structure 16. These longitudinal openings 28 defined along flexure 14 are arranged and spaced relative to the conductor array 16 in a manner enabling e.g. inductance, capacitance and resistance components of line impedance of the conductor structure to be tuned by varying the width dimension (w) relative to the array 16.

Since printed-circuit conductors do not enjoy the same electrical self-shielding attributes as a twisted pair, noise can be an important factor. A commonly assigned, copending U.S. patent application, Ser. No. 08/724,978 filed on Oct. 3, 1996, entitled: "Head Suspension with Self-Shielding Integrated Conductor Trace Array" discloses that the read path trace conductors may be shielded by an array layout placing the write conductor traces outboard of the read trace conductors. However, a need to preserve mechanical symmetry of the flexure 14 as shown, for example, by FIG. 3, suggests that best practice is to separately route the read and write conductor pairs R and W along opposite edges of the flexure 14. This desirably symmetrical arrangement of trace conductor pairs shown in FIG. 3 effectively precludes using the write trace conductors as shields for the read trace conductors.

Figure 3B:
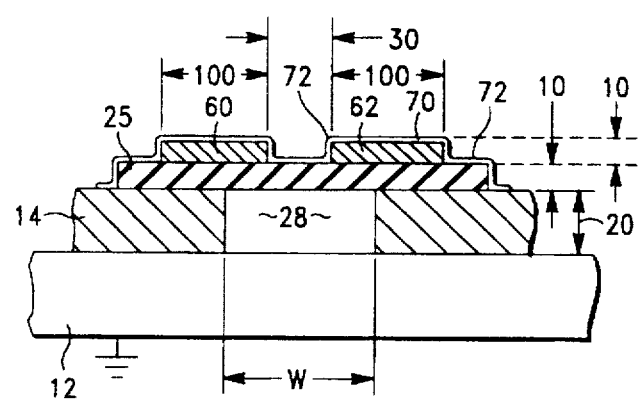
FIG. 3B is a greatly enlarged view in elevation and cross-section taken along section line 3B—3B in FIG. 3 show a thin film conductive shield formed on an outer dielectric layer for shielding two conductive traces of a trace pair in accordance with principles of the present invention.

As shown in FIG. 3B, in accordance with principles of the present invention, interconnect array 16 preferably includes a pair of conductive traces 60 and 62 which are arranged overlay alignment in two layers of the interconnect trace array 16. The first insulating polyimide (a flexible polymeric resinous material) layer 25 isolates the traces 60 and 62 from the thin stainless steel flexure 14. An outer insulative dielectric layer 70 of polyimide is formed over the first and second traces 60 and 62. The outer dielectric layer 70 has a thickness of e.g. 3–14 microns, and is most preferably about 3 microns in order to minimize additional stiffness of the flexure 14. An outer shield 72 is formed, most preferably by being deposited as a thin film metallic layer having a thickness of e.g. 0.1 to 1.0 microns (and most preferably about 0.1 microns) onto the outer polyimide layer 70. The thin film deposition layer 72 continues beyond the lateral ends of the outer layer 70 and over the end of the inner dielectric layer 25 in order to make electrical grounding contact with the stainless steel flexure 14. In turn, the flexure 14 is grounded to the load beam 12 which is grounded through the E-block and actuator structure 40 to the base 32 of the hard disk drive. The thin film shield layer 72 is provided to shield the traces 60 and 62 comprising e.g. the read element trace conductor pair R. The outer dielectric layer 70 has similar dielectric properties as the inner dielectric layer 25 and may be applied by any suitable method. The shield thin film layer 72 is preferably of copper, silver, gold, or stainless steel, and is most preferably a copper film.

As shown in FIG. 3B, a thin film shield 72 is electrically grounded to the flexure 14, and can have any suitable thickness, consistent with the overall desired mechanical properties of the flexure 14. Because it is grounded, the thin film shield layer 72 has the effect of increasing capacitance from each trace 60, 62 to the common ground plane. This capacitance to the common ground plane can be reduced, and the trace array impedance trimmed, by defining longitudinally extending windows in the shield 72, as by patterned reactive ion etch or by ion milling processes in accordance with the teachings of the referenced U.S. patent application Ser. No. 08/720,836. Alternatively, the capacitance to the common ground plane may be reduced by increasing the thickness of the outer dielectric layer 70, so long as the desired mechanical properties of the flexure 14 are not compromised.

In the FIG. 4 example of the present invention, the shield 72A ends at the dielectric layer 25 and is thereby electrically floated with respect to ground. In this embodiment the thickness of the shield 72A becomes an important design consideration for the electrical designer skilled in the art. If, for example, a wave front of an interference signal or noise at a certain frequency f strikes the non-grounded conductor shield 72A, the wave front will penetrate to a skin depth of δ, in accordance with the following uni-dimensional approximation:

$$\delta = \frac{1}{\sqrt{\pi f \mu \sigma}} \qquad \text{Eq. 1}$$

where δ is in meters, f is in Hertz, μ is the magnetic permeability, and σ is the electrical conductivity, of the metal forming the conductor shield 72A. The higher the σ, the thinner the shield layer 72A may be, given the same frequency. For example, if an ungrounded copper cover layer 72A is provided, at 100 MHz the skin depth for copper will be 6.6 microns (with $\sigma = 5.8 \times 10^7$ s/m and $\mu = \mu_0 = 4\pi \times 10^{-7}$ H/m). Thus, an ungrounded cover layer 72A having a 6.6 microns thickness would be effective in stopping the incoming interfering wave front at the 100 MHz frequency. By not grounding the cover layer 72A has the additional advantage of removing the resultant ground plane capacitance from proximity of the conductor trace pair. The floating conductive shield layer 72 may be applied by suitable metal selective deposition or plating processes upon the outer dielectric layer without establishing a ground connection path.

In the FIG. 5 embodiment, a shield 74 is formed against the dielectric layer 25 by e.g. electro-deposition of a metallic film of suitable thickness which is electrically connected to e.g. the flexure 14 and/or loadbeam 12. In the FIG. 6 example the flexure 14A is partially etched away to define a cavity 28A. In the FIG. 7 example the flexure 14B is also partially etched away and the resultant cavity filled by a suitable dielectric material 76.

The shielded trace array structure is formed by any suitable patterning technique, whether by way of photolithography and selective etch, or by selective deposition, lamination or attachment of the conductive traces and shields to the dielectric layers with adhesives, etc. The trace array structure is called "biaxially shielded" because the cover layer 72 or 72A combine and cooperate with the load beam 14 to shield the two conductive traces 60 and 62 of the read pair R and/or the two conductive traces of the write pair W. While traces 60 and 62 are illustrated as a preferred signal path for the read or write element, those skilled in the art will appreciate that a single trace conductor 60 as shown in the FIG. 8 example which forms a single-ended or unbalanced signal path via the ground return shield 72B may be effectively shielded by the techniques described herein. Moreover, as taught in commonly assigned, copending U.S. patent application Ser. No. 08/726,450, filed on Oct. 3, 1996, for "Multi-trace Transmission Lines for R/W Head Interconnect in Hard Disk Drive", the disclosure thereof being incorporated herein by reference, multiple traces may be provided in a parallel connection arrangement to provide a single signal path with reduced inductance. It will be appreciated by those skilled in the art when viewing the FIGS. 4–8 cross-sectional views, that these cross-sections are highly diagrammatic, and are not intended to be to scale. In practice, the cross-sectional width of a practical load beam 12 and/or flexure 14 may be considerably wider than suggested by these drawings, which are presented to illustrate the principles of the present invention, and are not intended as shop drawings for actual components.

Although the present invention has been described in terms of the presently preferred embodiment, i.e., a deposited conductor flexure structure which implements a gimbal, it should be clear to those skilled in the art that the present invention may also be utilized in conjunction with, for example, an integrated gimbal load beam structure, or other conductive suspension members having proximately mounted, deposited, or embedded conductors with insulating overcoatings and shielding thereon. Thus, it should be understood that the instant disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. An integrated load beam assembly including a load beam for supporting a read/write head/slider assembly adjacent to a storage medium and for electrically interconnecting the head to read/write circuitry, the load beam assembly comprising:

a generally planar conductive member, disposed on the load beam, extending to proximity of the read/write head/slider assembly;

a first electrical insulation layer formed on the conductive member;

a first electrical signal trace path formed on the first electrical insulation layer;

a second electrical insulation layer formed on the first electrical trace path;

a conductive shield layer formed on the second electrical insulation layer for shielding the first electrical signal path from electrical interference; and a longitudinal window defined by the conductive member directly beneath the first electrical signal trace path, the longitudinal window having a width selected to control electrical impedance of the assembly.

2. The integrated load beam assembly set forth in claim 1 wherein the generally planar conductive member comprises a flexure connected to the load beam and including a gimbal for positioning the read/write head/slider assembly in close proximity to the storage medium.

3. The integrated load beam assembly set forth in claim 1 further comprising a second electrical trace path formed on the first electrical insulation layer and laterally offset relative to the first electrical trace path thereby to form a first conductor trace pair.

4. The integrated load beam assembly set forth in claim 3 wherein the shield layer covers the first electrical trace path and the second electrical trace path.

5. The integrated load beam assembly set forth in claim 4 wherein the shield layer is grounded to the generally planar conductive member.

6. The integrated load beam assembly set forth in claim 3 further comprising a third electrical insulation layer disposed on the conductive member, and third and fourth electrical signal traces formed as a second pair on the third electrical insulation layer thereby to form a second conductor trace pair, the first conductor trace pair being disposed along one longitudinal edge region of the conductive member, and the second conductor trace pair being disposed along another longitudinal edge region of the conductive member transversely spaced apart from the one edge region.

7. The integrated load beam assembly set forth in claim 1 wherein the longitudinal window is at least in part occupied by a dielectric material.

8. The integrated load beam assembly set forth in claim 1 wherein the longitudinal window includes a shield formed as a thin film metal deposition layer.

9. An integrated load beam assembly for supporting a read/write head/slider assembly adjacent to a storage medium and for electrically interconnecting the head to a read/write circuitry, the load beam assembly comprising:

a generally planar formed load beam supporting the read/write head/slider assembly at a distal end;

a generally planar conductive member disposed on the load beam and extending to proximity of the read/write head/slider assembly;

a first electrical insulation layer disposed on the conductive member;

at least one electrical trace path disposed on the first electrical insulation layer;

a shield connected to the generally planar conductive member and disposed in overlying and surrounding relation, and spaced away from, the at least one electrical trace path; and a longitudinal window defined by the conductive member directly beneath the first electrical signal trace path, the longitudinal window having a width selected to control electrical impedance of the assembly.

10. The integrated load beam assembly set forth in claim 9 further comprising a second electrical insulation layer disposed on the at least one electrical trace path and separating the shield from the trace path.

11. The integrated load beam assembly set forth in claim 9 comprising a plurality of electrical traces defining substantially parallel signal paths disposed on the first electrical insulation layer and enveloped by the shield.

12. An integrated flexure/conductor structure for supporting a read/write head/slider assembly on a load beam adjacent to a storage medium and for electrically interconnecting the head to read/write circuitry, the flexure/conductor structure comprising:

a generally planar conductive flexure member having a gimbal for supporting the read/write head/slider assembly;

a first electrical insulation layer disposed on the flexure member;

first and second electrical trace paths disposed on the first electrical insulation layer, a second electrical insulation layer disposed on the first and second electrical trace paths;

an electrical shield disposed on the second electrical insulation layer for shielding the first and second electrical trace paths; and a longitudinal window defined by the conductive member directly beneath the first and second electrical signal trace paths, the longitudinal window having a width selected to control electrical impedance of the assembly, wherein the integrated flexure/conductor structure is disposed on the load beam thereby providing a low-profile suspension assembly.

13. The integrated flexure/conductor structure set forth in claim 12 wherein the electrical shield is connected to the conductive flexure.

14. The integrated flexure/conductor structure set forth in claim 13 wherein the electrical shield comprises a thin film metal deposition upon the second insulation layer, and extending to contact the conductive flexure member.

* * * * *